United States Patent Office 3,849,456
Patented Nov. 19, 1974

3,849,456
PREPARATION OF METHYL ALKANOATES
Charles H. McMullen, Scarsdale, N.Y., assignor to Union Carbide Corporation, New York, N.Y.
No Drawing. Filed Mar. 22, 1972, Ser. No. 236,968
Int. Cl. C07c 67/00
U.S. Cl. 260—410.9 R
6 Claims

ABSTRACT OF THE DISCLOSURE

A liquid phase process for the preparation of methyl alkanoates which comprises reacting, under carefully controlled conditions, methyl formate and ethylene in the presence of certain organic peroxide initiators. The process results in predominant quantities of linear or straight-chain methyl alkanoates and very small amounts of branched-chain methyl alkanoates or undesirable alkyl formate by-products.

This invention relates to a process for the preparation of linear or straight-chain methyl alkanoates without producing any appreciable quantities of branched-chain methyl alkanoates or undesirable telomeric alkyl formate by-products.

It is disclosed in the prior art that linear or straight-chain methyl alkanoates can be prepared by reacting methyl formate and ethylene at 130°–135° C. in the presence of di-$t$-butyl peroxide; see W. H. Urry et al., J. Am. Chem. Soc., 75, 4877 (1953). In addition to the desired linear methyl alkanoate products, appreciable quantities of mixtures of branched-chain methyl alkanoate and telomeric alkyl formate by-products, e.g.,

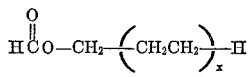

wherein $x$ is an integer, are formed during the reaction. These telomeric alkyl formate by-products are undesirable inasmuch as they are extremely difficult to remove from the desired linear methyl alkanoate products, and further, they are capable of undergoing hydrolysis to formic acid, a strong organic acid, and to the corresponding alkanols. Thus, linear methyl alkanoates which are contaminated with such telomeric alkyl formates are not suitable in certain end-use applications as in the cosmetics field. In lubricant applications, it is desirable to employ linear methyl alkanoates since the branched-chain methyl alkanoates undergo oxidative degradation at high temperatures. Unfortunately, the separation of the branched-chain methyl alkanoates from the linear methyl alkanoates is quite expensive and difficult.

There has now been discovered a novel process for producing predominant quantities of linear or straight-chain methyl alkanoate products while maintaining the formation of branched-chain methyl alkanoate and higher alkyl formate by-products at a very low level. In the practice of preferred embodiments of the invention there can be obtained upwards to about 85 weight percent, and higher, of the desired straight-chain methyl alkanoates and generally less than one weight percent of the aforedescribed undesirable by-products.

In the practice of the invention predominant quantities of linear methyl alkanoates are prepared via a process which comprises reacting (i) in the liquid phase, (ii) methyl formate with ethylene, (iii) in the presence of an initiating amount of certain organic peroxides described hereinafter, (iv) at a temperature in the range of from about 50° C. to 115° C., (v) using a molar excess of said methyl formate with relation to said ethylene, and (vi) for a period of time sufficient to produce said linear methyl alkanoates.

The present invention thus provides, in the practice of suitable embodiments, a novel route for coupling methyl formate with ethylene to produce a mixture of linear methyl alkanoates as shown in the following equation:

wherein $m$ represents 1, 2, 3, 4 . . . 40, and higher, the sum of which equals the integer $y$. The present invention is thus capable of producing linear methyl alkanoates which range from liquid to wax-like solids.

The organic peroxides which are desirable as initiators in the novel process are the alkyl peracylates such as the alkyl peralkanoates preferably having the formula

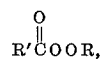

the diacyl peroxides preferably having the formula

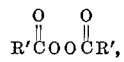

and the organic peroxides preferably having the formula $R_1OOH$; wherein R is alkyl which suitably has from 1 to 15 carbon atoms, wherein each R', individually, is alkyl or aryl which suitably has from 1 to 15 carbon atoms; and wherein $R_1$ is alkyl cycloalkyl, or aralkyl which suitably has from 1 to 15 carbon atoms. Illustrative organic peroxides include isopropyl peracetate, $t$-butyl peracetate, 2-ethylhexyl peracetate, $t$-butyl perpropionate, $n$-hexyl perpropionate, 2-ethylhexyl perpropionate, $t$-butyl perbutyrate, isoamyl perbutyrate, $t$-butyl perbenzoate, dibenzoyl peroxide, diacetyl peroxide, dibutanoyl peroxide, di(alkylbenzoyl) peroxide, $t$-butyl hydroperoxide, triphenylmethyl hydroperoxide, Tetralin hydroperoxide, cumyl hydroperoxide, benzyl hydroperoxide, alpha-methyl-alpha-ethylbenzyl hydroperoxide, and the like.

The quantity of organic peroxide initiator can vary over a wide range. In general, the novel process is effected in the presence of an initiating amount of the organic peroxide which gives a suitable and reasonable reaction rate. Broadly, one can employ from about $1 \times 10^{-5}$ mole to about 1 mole of peroxide per liter of liquid reaction mixture, and preferably from about $1 \times 10^{-3}$ to about $1 \times 10^{-1}$ mole of peroxide per liter of liquid reaction mixture.

The novel process is conducted below about 115° C. and above 50° C. Temperatures exceeding the above-stated range are to be avoided since there are formed appreciable quantities of telomeric alkyl formates and branched-chain methyl alkanoates. On the other hand, the reaction rate becomes markedly slow when operating at temperatures lower than the minimum stated above. The formation of such by-products results in loss of productivity as well as losses in efficiencies to linear methyl alkanoate products based on both methyl formate and ethylene. The term "productivity" is meant the amount by weight of linear methyl alkanoate products which is produced in a unit period of time per unit of reactor volume. The term "methyl formate efficiency" is a value obtained by dividing the moles of linear methyl alkanoate products produced during the reaction by the moles of methyl formate consumed during the reaction, multiplied by 100. The term "ethylene efficiency" is a value obtained by dividing the moles of linear methyl alkanoate products produced during the reaction by the moles of ethylene consumed during the reaction, multiplied by 100. A preferred temperature range is from about 70° to about 110° C.

The coupling reaction of methyl formate and ethylene is effected in the liquid phase. If desired, there can be employed an inert normally-liquid organic diluent such as the saturated aliphatic hydrocarbons, dialkyl ketones, benzene and chlorinated benzenes, naphthalene, and the like. Pressure is not narrowly critical and the autogeneous pressure of the reaction is sufficient to maintain the reactants in the liquid phase. In general, pressures in the range of from about 250 p.s.i.g. to about 2500 p.s.i.g. is suitable. By adjusting the ethylene pressure, the average molecular weight of the methyl alkanoates can be varied. For example, it has been observed that a reaction temperature of 100° C. and an ethylene pressure of 500 p.s.i.g. resulted in methyl alkanoate products having an average molecular weight of about 300. Increasing the ethylene pressure to about 800 p.s.i.g. resulted in methyl alkanoate products whose average molecular weight was approximately 800.

It is necessary to employ a molar excess of methyl formate with relation to ethylene. Methyl formate can serve as both reactant and diluent in the novel process. In the practice of preferred embodiments of the invention highly satisfactory results can be achieved by using from about two to about 20 moles of methyl formate per mole of ethylene. If desired, the novel process can be effected under an atmosphere of ethylene admixed with an inert gas, e.g., nitrogen.

The novel process is effected for a period of time sufficient to produce linear methyl alkanoate products. In general, the residence period can vary from minutes to days, e.g., from about 30 minutes to a couple of days, and longer. It is readily appreciated that the residence period will be influenced, to a significant extent, by the reaction temperature, the concentration of the reactants, the choice of the peroxide initiator and other factors. In general, the synthesis of desired methyl alkanoate products by the coupling reaction of methyl formate with ethylene is suitably conducted under operating conditions which give reasonable reaction rates and/or conversions.

In one embodiment the novel process is effected in the presence of a catalytically effective quantity of metal-containing compounds which accelerate the rate of reaction. Such compounds, or catalysts, which are suitable in the practice of the invention are those in which the metal moiety is capable of undergoing a one electron redox cycle between a relatively stable plus two (+2) oxidation state and a relatively stable plus three (+3) oxidation state. Particularly desirable metal moieties include the transition metals as characterized by cobalt(II), cobalt(III), manganese(II), manganese(III), chromium(II), chromium(III), iron(II), and iron(III). These metal-containing compounds can be in the form of salts, complexes, oxides, etc., and the metal moiety thereof can be in its higher oxidation state or its lower oxidation state. Illustrative of the metal-containing compounds which are suitable include cobalt(II) acetylacetonate, cobalt(III) acetylacetonate, iron(II) acetylacetonate, iron(III) acetylacetonate, chromium(II) acetylacetonate, chromium(III) acetylactonate, manganese(II) acetylacetonate, manganese(III) acetylacetonate, chromium(II) oxide, chromium(III) oxide, manganese(II) oxide, manganese(III) oxide, cobalt(III) acetate, cobalt(III) propionate, cobalt(III) butyrate, chromium(II) acetate, manganese(II) acetate, iron(III) acetate, iron(II) carbonate, manganese(II) carbonate, cobalt(II) sulfate, manganese(II) sulfate, iron(II) sulfate, iron(II) ammonium sulfate, iron(III) sulfate, iron(III) chloride, cobalt(II) nitrate, cobalt(II) chloride, cobalt(III) chloride, chromium(III) ethylenediaminetetraacetic acid, cobalt(II) dimethylglyoximate, manganese(III) chloride, and the like. In general, the metal salts of mineral acids, carboxylic acids, oxides, etc., as well as the metal complexes with beta-keto acids, beta-diketones, etc. are useful forms for introducing the metal moiety into the liquid reaction mixture.

The novel process can be executed in a batch, semicontinuous, or continuous fashion. The reaction can be conducted in a single reaction zone or a plurality of reaction zones, in series or in parallel, or it may be conducted intermittently or continuously in such zone(s). The material of construction should be such that it is inert during the reaction and the fabrication of the equipment should be able to withstand the reaction temperature and pressure. Agitation means to vary the degree of mixing the reaction mixture can be suitably employed. Means to introduce and/or adjust the reactants, initiator, etc., either intermittently or continuously, into the reaction zone during the course of the reaction can be conveniently utilized in the novel process especially to maintain the desired molar ratios of the reactants.

The linear methyl alkanoate products are useful as lubricants, as plasticizers, as components in cosmetics, as polymeric modifiers, etc. They can be suitably employed as mixtures.

EXAMPLES

In the operative Examples, the experiments were carried out in a 1-liter autoclave, fitted with a Pyrex® glass-liner, a Teflon®-coated cooling coil, a stirrer and a pressure relief valve. A solution of the peroxide initiator in methyl formate was introduced into the autoclave. Ethylene was then continuously introduced into the autoclave and the resulting reaction mixture was heated to reaction temperature. The reaction mixture was maintained under a constant ethylene pressure during the course of the reaction. At the termination of the experiments the reaction product mixture was analyzed spectroscopically and by gas chromatography. In these experiments the term "parts" indicates "parts by weight."

EXAMPLE 1

To the autoclave there were charged 480 parts of methyl formate and 14 parts of a 75 weight percent solution of t-butyl peracetate in benzene. Ethylene was continuously introduced into the autoclave. The resulting reaction mixture was held at about 100° C. for a period of 17 hours. The reaction mixture was maintained under an ethylene pressure of 500 p.s.i.g. during the course of the reaction. After the termination of the reaction, unreacted methyl formate and t-butanol were removed by distillation from the reaction product mixture. Analyses showed that there remained 50 parts of higher boiling materials of which 85 weight percent represented a mixture of telomeric linear methyl alkanoate products having the general formula

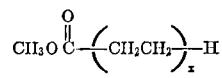

wherein x represents 1, 2, 3, 4, 5 . . . etc., and wherein the average molecular weight was approximately 300. Telomeric saturated aliphatic hydrocarbons representing about 12 weight percent were also detected. Such telomeric hydrocarbons are not considered to be deleterious in the end-use applications contemplated for the desired telomeric linear methyl alkanoate products such as in lubricant and cosmetic applications. There were detected only trace quantities of telomeric alkyl formates having the general formula

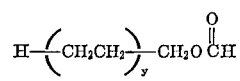

wherein y represents 1, 2, 3, 4 . . . etc., and telomeric branched-chain methyl alkanoates.

EXAMPLE 2

To the autoclave there were charged 300 parts of methyl formate and 14 parts of a 75 weight percent solution of t-butyl peracetate in benzene. Ethylene was continuously introduced into the autoclave. The resulting reaction mixture was held at about 100° C. for a period of 20 hours. The reaction mixture was maintained under an ethylene pressure of 800 p.s.i.g. during the course of the reaction. After the termination of the reaction, unreacted methyl formate and t-butanol were removed by distillation from the reaction product mixture. Analyses showed that there remained 158 parts of higher boiling materials of which 84 weight percent represented a mixture of telomeric linear methyl alkanoate products having the general formula

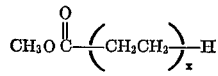

wherein $x$ represents 1, 2, 3, 4, 5 ... etc., and wherein the average molecular weight was approximately 800. Telomeric saturated aliphatic hydrocarbons represented the other principal product. Only trace quantities of telomeric alkyl formates and telomeric branched-chain methyl alkanoates were detected.

EXAMPLE 3

To the autoclave there were charged 300 parts of methyl formate and 12 parts of dibenzoyl peroxide. Ethylene was continuously introduced into the autoclave. The resulting reaction mixture was held at about 80° C. for a period of 18 hours. The reaction mixture was maintained under an ethylene pressure of 300 p.s.i.g. during the course of the reaction. After the termination of the reaction unreacted methyl formate was removed by distillation from the reaction product mixture. Analyses showed that there were obtained 22 parts consisting principally of telomeric linear methyl alkanoate products and benzoic acid. Only trace quantities of telomeric alkyl formates and telomeric branched-chain methyl alkanoates were detected.

EXAMPLE 4

To the autoclave there were charged 480 parts of methyl formate, 14 parts of t-butyl hydroperoxide, and 10 parts of nonane. Ethylene was continuously introduced into the autoclave. The resulting reaction mixture was held at about 100° C. for a period of 20 hours. The reaction mixture was maintained under an ethylene pressure of 500 p.s.i.g. during the course of the reaction. After the termination of the reaction unreacted methyl formate and other low boiling material were removed by distillation from the reaction product mixture. Analyses showed that there was obtained about 20 parts of higher boiling material of which approximately 90 weight percent represented a mixture of telomeric linear methyl alkanoate products. Approximately 10 weight percent telomeric saturated aliphatic hydrocarbons were detected. However, only trace quantities of telomeric alkyl formates and telomeric branched-chain methyl alkanoates were observed in the products.

EXAMPLE 5

A. To the autoclave there were charged 300 parts of methyl formate, 4 parts of di-t-butyl peroxide, and 10 parts of nonane. Ethylene was continuously introduced into the autoclave. The resulting reaction mixture was held at about 130° C. for a period of 20 hours. The reaction mixture was maintained under an ethylene pressure of 400 p.s.i.g. during the course of the reaction. After the termination of the reaction unreacted methyl formate and other low boiling material were removed by distillation from the reaction product mixture. Analyses showed that there were obtained 70 weight percent of a mixture of telomeric linear methyl alkanoate products, 12 weight percent telomeric linear saturated aliphatic hydrocarbons, 13 weight percent telomeric linear alkyl formates, and 5 weight percent telomeric branched-chain methyl alkanoates.

B. When conducting the above experiment (A) at 100° C., virtually no telomeric linear methyl alkanoate products were obtained.

What is claimed is:

1. A process for the preparation of telomeric linear methyl alkanoates which comprises reacting (i) in the liquid phase, (ii) methyl formate with ethylene, (iii) in the presence of an initiating amount of an organic peroxide of the group consisting of alkyl peracylates, diacyl peroxides, and organic hydroperoxides, (iv) at a temperature in the range of from about 50° C. to 115° C., (v) using a molar excess of said methylformate with relation to said ethylene, and (vi) for a period of time sufficient to produce said telomeric linear methyl alkanoates.

2. The process of claim 1 wherein said alkyl peracylate is alkyl peralkanoate.

3. The process of claim 2 wherein the concentration of said alkyl peralkanoate is in the range of from about $1 \times 10^{-5}$ to about one mole per liter of liquid reaction mixture.

4. The process of claim 3 wherein the mole ratio of said methyl formate to said ethylene initially present in the reaction mixture is in the range of from about 2:1 to about 20:1.

5. The process of claim 4 wherein the operative temperature is in the range of from about 70°C. to about 110° C.

6. The process of claim 5 wherein said alkyl peralkanoate is t-butyl peracetate.

References Cited

UNITED STATES PATENTS 2,585,723   2/1952   Banes et al. _____ 260—533
3,099,665   7/1963   Emrick et al. _____ 260—410.6

FOREIGN PATENTS 1,299,293   7/1969   Germany.

OTHER REFERENCES

Urry et al.: Am. Chem. Soc. 75, 4876–77 (1953).
Nikishin et al.: Izvest. Akad. Nauk SSSR, Otdel, Khim Nauk (1957) 1488–9 (1957).
Petrow et al.: Fette, Seifen, Anstrichmittel 59 (12) 1023 (1957).
Terent'ev et al.: Izv. Akad. Nauk. SSSR, Ser. Khim. 1966 (10) 1854–6 (1966).
Chemical Abstracts, vol. 72, 111856q (1970).

LEWIS GOTTS, Primary Examiner

D. G. RIVERS, Assistant Examiner

U.S. Cl. X.R.

260—491